Patented Oct. 19, 1937

2,096,336

UNITED STATES PATENT OFFICE 2,096,336

PRODUCTION OF EBONITE POWDER FOR MOLDING PURPOSES

Francis Norman Pickett, Westminster, London, England

No Drawing. Application November 9, 1934, Serial No. 752,368. In Great Britain November 9, 1933

2 Claims. (Cl. 18—50)

This invention relates to the production of ebonite powder for molding purposes.

It has for its object to provide a molding powder composed of materials that may be compressed in a mold at a pressure and temperature usually obtained in ordinary rubber presses (60 lbs. steam pressure) so that the powder unites to form a solid ebonite molding having a very small shrinkage.

According to the invention the molding powder is made by uniting in the mold ebonite or rubber powders one of which may be unvulcanized or all of which may be vulcanized of different degrees of hardness, sulphur content and cure. The hard powder is preferably very finely ground until it will pass through a 300 mesh screen.

One of the advantages of the powder according to the invention is that I can reproduce in the physical characteristics of the powder and of the finished molding, those of bakelite and similar substances, so that standard bakelite molds of the plunger type and presses may be utilized for the manufacture of ebonite moldings without modification, since in addition to the molding qualities of the powder, the shrinkage is approximately the same as that of bakelite.

The hard powder may have the following compositions:

| | Parts |
|---|---|
| Rubber | 50 |
| Sulphur | 15 |
| China clay | 15 |

After mixing in a mill, this mixture is cured in a steam cure and then pulverized until the powder so obtained will pass through a 300 mesh screen, although a coarser powder may be used.

A softer powder or crumb may be obtained from the following constituents:

| | Parts |
|---|---|
| Rubber | 50 |
| Carbon black | 17 |
| Zinc oxide | 5 |
| Sulphur | 1½ to 2 |

When cured this results in a soft vulcanized rubber which may be crumbed in a grinder whereby soft powder is produced. In the case of soft powder the mix may be reduced to crumb before vulcanizing by suitable compounding.

The two powders preferably in the proportions of 75% of hard powder to 25% of soft powder are intimately mixed with or without the addition of an accelerator placed into a plunger type mold, with or without the addition of more sulphur, and/or accelerator, and is then placed between the platens of a steam heated press and subjected to curing there at a pressure preferably of 1 ton per square inch and a steam pressure on the hot platens preferably not exceeding 60 lbs. per square inch.

It has been found in these circumstances that a curing time of 3 to 5 minutes is sufficient and that a perfect solid ebonite molding is produced. Alternatively the molds may be placed in an autoclave and cured at a steam pressure of from 2 to 7 atmospheres for a longer period.

What I claim and desire to secure by Letters Patent is:—

1. The method of making an ebonite article which comprises molding an intimate mixture comprising a major proportion of hard vulcanized rubber powder and a minor proportion of soft vulcanized rubber powder.

2. The method of making an ebonite article which comprises molding an intimate mixture comprising hard and soft vulcanized rubber powders in the proportion of about 3 parts of hard rubber powder to about 1 part of soft rubber powder.

FRANCIS NORMAN PICKETT.